(12) United States Patent
Fassiau et al.

(10) Patent No.: US 7,893,195 B2
(45) Date of Patent: Feb. 22, 2011

(54) METHOD FOR RECOVERING A POLYMER FROM A LIQUID MEDIUM

(75) Inventors: Eric Fassiau, Brussels (BE); Bernard Vandenhende, Leest (BE); Jean-Raphael Caille, Namur (BE); Jean-Christophe Lepers, Ottignies (BE)

(73) Assignee: SOLVAY (Societe Anonyme), Brussels (BE)

( * ) Notice: Subject to any disclaimer, the term of this patent is extended or adjusted under 35 U.S.C. 154(b) by 421 days.

(21) Appl. No.: 12/063,710

(22) PCT Filed: Aug. 17, 2006

(86) PCT No.: PCT/EP2006/065396

§ 371 (c)(1),
(2), (4) Date: Feb. 13, 2008

(87) PCT Pub. No.: WO2007/020280

PCT Pub. Date: Feb. 22, 2007

(65) Prior Publication Data

US 2010/0179292 A1 Jul. 15, 2010

(30) Foreign Application Priority Data

Aug. 19, 2005 (FR) .................................. 05 08634

(51) Int. Cl.
*C08F 6/00* (2006.01)
(52) U.S. Cl. ................. 528/500; 528/480; 528/491; 528/493; 528/499; 528/502 E; 521/40; 521/46; 521/46.5
(58) Field of Classification Search .............. 521/40, 521/40.5, 41, 42, 42.5, 43, 44, 45, 46, 46.5, 521/47, 48, 48.5, 91; 528/48, 481, 483, 484, 528/491, 495, 499, 500, 501, 502 A, 502 C, 528/502 D, 502 E, 503, 480, 493, 496, 494
See application file for complete search history.

(56) References Cited

U.S. PATENT DOCUMENTS 3,590,026 A * 6/1971 Carlson et al. .............. 528/500

(Continued)

FOREIGN PATENT DOCUMENTS

CA       617788        4/1961

(Continued)

OTHER PUBLICATIONS

Herman F. Mark et al., Encyclopedia of Polymer Science and Engineering, vol. 16: "Styrene Polymers to Toys", Second Edition (1989), pp. 62-63, John Wiley & Sons, Inc., New York, (2 pp.).

(Continued)

*Primary Examiner*—Ling-Siu Choi
*Assistant Examiner*—Frances Tischler
(74) *Attorney, Agent, or Firm*—Oblon, Spivak, McClelland, Maier & Neustadt, L.L.P.

(57) ABSTRACT

Method for recovering a polymer from a liquid medium (1) substantially containing the polymer and a solvent for the latter, wherein:

(a) this liquid medium (1) is injected into a reactor (2) containing a stirred substantially monophase liquid mixture comprising a major fraction by weight of a non-solvent and a minor fraction by weight of a solvent, the mixture having a composition and temperature such that the polymer precipitates therefrom progressively;
(b) the polymer is recovered in the form of particles in suspension (5) in a liquid rich in non-solvent;
(c) the polymer particles (9) are separated from the liquid.

20 Claims, 2 Drawing Sheets

U.S. PATENT DOCUMENTS

| | | | |
|---|---|---|---|
| 4,038,219 A * | 7/1977 | Boehm et al. | 521/46.5 |
| 6,172,125 B1 | 1/2001 | Vandenhende et al. | |
| 6,989,404 B2 | 1/2006 | Yamamoto et al. | |
| 7,056,956 B2 | 6/2006 | Vandenhende et al. | |
| 7,135,546 B1 | 11/2006 | Vandenhende et al. | |
| 2003/0119925 A1* | 6/2003 | Vandenhende et al. | 521/40 |
| 2005/0010027 A1 | 1/2005 | Vandenhende et al. | |
| 2005/0077640 A1 | 4/2005 | Fassiau et al. | |
| 2006/0173085 A1 | 8/2006 | Fassiau et al. | |
| 2006/0173086 A1 | 8/2006 | Fassaiau et al. | |
| 2006/0194913 A1 | 8/2006 | Pleska et al. | |
| 2006/0223896 A1 | 10/2006 | Lepers et al. | |
| 2007/0255040 A1 | 11/2007 | Vandenhende et al. | |
| 2008/0047671 A1 | 2/2008 | Vandenhende | |

FOREIGN PATENT DOCUMENTS

| | | |
|---|---|---|
| DE | 19829898 A1 | 1/2000 |
| EP | 94581 A1 | 9/1999 |
| JP | 11012390 A | 1/1999 |
| SU | 76792 | 4/1948 |
| SU | 835131 | 5/1980 |
| WO | WO0123463 A1 | 4/2001 |
| WO | WO0170865 A1 | 9/2001 |
| WO | WO03054064 A1 | 7/2003 |
| WO | WO2004081093 A1 | 9/2004 |
| WO | WO2005014705 A1 | 2/2005 |
| WO | WO2005103130 A1 | 11/2005 |
| WO | WO2006030020 A1 | 3/2006 |
| WO | WO2006051116 A1 | 5/2006 |
| WO | WO2006053907 A1 | 5/2006 |
| WO | WO2006069856 A1 | 7/2006 |
| WO | WO2007039625 A1 | 4/2007 |

OTHER PUBLICATIONS

D. W. Van Krevelen, "Properties of Polymers," Third Edition (1990), Elsevier Science Publishers, Amsterdam, Oxford, New York, pp. 200-202 (3 pp.).

H. Burrel, "Solubility Parameter Values" in Polymer Handbook, Second Edition (1975) J. Brandrup and E. H. Immergut, Eds., Interscience, New York City, section IV, pp. 337-359 (23 pp.).

PCT International Search Report dated Nov. 22, 2006 for International Application No. PCT/EP2006/065396 (3 p.).

PCT International Preliminary Report on Patentability dated Feb. 20, 2008 including the Written Opinion for International Application No. PCT/EP2006/065396 (6 p.).

Search Report dated Jun. 12, 2006 from the Institut National De La Propriete Industrielle for French Application No. FR05/08634 (2 p.).

U.S. Appl. No. 11/719,714, filed May 18, 2007, Fassiau.

U.S. Appl. No. 11/719,825, filed May 21, 2007, Fassiau.

U.S. Appl. No. 11/719,255, filed Sep. 21, 2007, Vandenhende.

U.S. Appl. No. 12/677,906, Jean-Christophe Lepers.

* cited by examiner

METHOD FOR RECOVERING A POLYMER FROM A LIQUID MEDIUM

CROSS-REFERENCE TO RELATED APPLICATIONS

This application claims priority to French Application No. 05.08634, filed Aug. 19, 2005, the entirety of which is incorporated herein by reference.

The present invention relates to a method for recovering a polymer from a liquid medium containing it, as well as a powder of polymer particles that can be obtained by this method.

Polymers are abundantly used in various forms, mainly in the solid state. However, it happens that, in one or more stages of their existence, they are present in a liquid medium, more often in the form of a solution in a solvent from which they must then be extracted. Thus, polymer solutions have to be dealt with at the end of some polymerization processes (called "solution polymerization processes"), during some recycling processes, and during the cleaning of some installations for the manufacture of polymer-based objects or paints. Recovery of the polymer in the solid state starting with a solution generally involves at least one step of evaporating the solvent. Now, this operation is often costly on account of its energy consumption and does not necessarily lead to polymer particles of a suitable granulometry. Moreover, these polymer particles often have a residual solvent content that is not negligible.

Patent Application JP 11/012390 describes a method for recovering a polymer in solution, according to which said solution is atomized and put into contact with steam so as to evaporate the solvent residues. It has however been found that this method is only applicable to dilute polymer solutions, solutions that are too concentrated being too viscous for the formation of droplets by atomization.

The patent application published under number WO 03/054064 in the name of Solvay describes a method for recovering a polymer in solution in a solvent, the whole forming a homogeneous medium. This method comprises the following steps:
(1) a non-solvent is added to the homogeneous medium so as to make it heterogeneous;
(2) the heterogeneous medium is converted into droplets by atomization;
(3) the droplets are put into contact with a gas which vaporizes the solvent;
(4) the polymer is recovered in the form of particles.

Although the method described in the latter application makes it possible to recover polymers starting with more concentrated solutions, it has been found that, in this case, removal of the solvent by vaporization during step (3) is not always achieved with the desired efficiency, it being possible for a not inconsiderable part of the solvent to be found in the polymer particles which agglomerate and form crusting in the atomization device. Moreover, in order to reduce the height of the device to reasonable proportions, a high temperature is often used, which rapidly leads to blockage of the atomization nozzles.

Other methods involving the atomization/nebulization of a polymer solution have been proposed. Thus, for example, patent CA 617,788 describes a method for recovering waste polymers by dissolving them in a low boiling point solvent and injecting the solution into boiling water or conversely by injecting steam into the polymer solution. However, the polymer particles obtained in this way are in the form of spongy flakes, which have a high residual solvent content and which are difficult and even impossible to employ by usual techniques (extrusion, calendering, injection moulding etc.). Moreover, the method described in this document is a discontinuous method which, in an industrial method, is not economically advantageous.

The subject of the present invention is consequently the provision of an improved method for recovering a polymer from a liquid medium containing the polymer at concentrations that may be high, while enabling a resulting solid product to be obtained with a low residual solvent content and a morphology and particle size distribution that are easily controlled. This method is also one that can be easily adapted to be continuous.

The present invention consequently relates to a method for recovering a polymer from a liquid medium containing the polymer and a solvent for the latter, according to which:
(a) this liquid medium is injected into a reactor containing a stirred substantially monophase liquid mixture comprising a major fraction by weight of a non-solvent and a minor fraction of by weight of solvent, the mixture having a composition and temperature such that the polymer precipitates therefrom progressively;
(b) the polymer is recovered in the form of particles suspended in a liquid rich in non-solvent;
(c) the polymer particles are separated from the liquid.

The key factor in the present invention therefore lies in the combination of a precipitation "bath" containing the solvent (and not only a non-solvent) and adequate stirring of said bath. Without wishing to be bound by any particular theory, the Applicant thinks that the fact of using, as a precipitation "bath", a mixture of a non-solvent and a solvent slows down the rate of precipitation and in doing so makes possible/facilitates drainage of the solvent from solution droplets. Moreover, the fact of using adequate stirring makes it possible to hold the polymer particles in suspension during their formation (from solution droplets) and to prevent their agglomeration.

The polymer whose recovery is aimed at by the method according to the present invention may be of any nature. It may consist of a thermoplastic resin or of an elastomer, but in any case a resin that can be dissolved in a solvent and which is therefore not crosslinked or only crosslinked to a small extent. It may consist of a resin that has not been previously used (or virgin resin), which has not undergone any forming by fusion except possible granulation, or it may consist of an already used resin (waste from production or recycled resin). It may consist of apolar polymers, such as ethylene polymers (PE) or propylene polymers (PP). It may also consist of polar polymers, such as polymers derived from styrene monomers, acrylic monomers and halogenated ethylenically unsaturated monomers or furthermore ethylene/vinyl alcohol (EVOH) or ethylene/vinyl acetate or butyl acrylate (EVA, EBA etc.) copolymers. It may also consist of thermoplastic polymers resulting from condensation reactions such as polycarbonates obtained by the reaction of bisphenol A and phosgene for example.

Among the polymers derived from styrene monomers, mention may be made of styrene homopolymers and copolymers. Among styrene homopolymers that can be recovered by the method of the present invention, mention may be made of transparent polystyrene called "crystal" or "general purpose" as defined for example in the "Encyclopedia of Polymer Science and Engineering" published by John Wiley & Sons, volume 16, 1989, pages 62-63. Mention may also be made of expanded polystyrene that can be obtained, either by the addition of a blowing agent, such as for example pentane, during polymerization and the subsequent treatment with steam, or by injection of a gas (pentane for example) under pressure into the molten polymer during its extrusion.

Among the styrene copolymers that can be recovered by the method of the present invention, mention may be made of:
copolymers of styrene with acrylonitrile;
copolymers of styrene with alkyl acrylates such as methyl methacrylate for example;
copolymers of styrene with maleic anhydride;
copolymers of styrene with divinylbenzene;
copolymers of styrene with alkylstyrenes such as alpha-methylstyrene for example;
random copolymers of styrene and butadiene;
copolymers comprising a block containing styrene units and an elastomeric block; polystyrenes called "high-impact polystyrene (HIPS)" belong to this category. These copolymers are more often obtained by grafting the elastomeric block onto the styrene block. As graftable elastomeric blocks, mention may be made of polybutadiene, butadiene-styrene copolymers and ethylene-propylene-diene terpolymers. The block containing styrene units may itself be a copolymer, such as a styrene-acrylonitrile copolymer or a styrene-methyl methacrylate copolymer.

Among the polymers derived from acrylic monomers, mention may be made of polymers derived from alkyl acrylates and methacrylates, of which the alkyl radical has 1 to 18 carbon atoms. As examples of these polymers, mention may be made of methyl, ethyl, n-propyl and n-butyl acrylates and methacrylates.

The definition "polymers derived from halogenated ethylenically unsaturated monomers" is understood to denote, within the meaning of the present invention, homopolymers of these monomers as well as copolymers that these form between themselves and/or with at least one non-halogenated ethylenically unsaturated monomer. The halogenated monomer is preferably chosen from chlorinated and fluorinated monomers, particularly from chlorinated monomers.

Polymers derived from fluorinated monomers are understood to denote homopolymers of these monomers and copolymers that these form with at least one other halogenated monomer, and/or another non-halogenated ethylenically unsaturated monomer such as ethylene, vinyl acetate and acrylic or methacrylic monomers.

Fluorinated monomers are understood to denote ethylenically unsaturated fluorinated monomers that are aliphatic and that have one or more fluorine atoms as the only heteroatom or heteroatoms. As examples of fluorinated monomers of which the number of fluorine atoms is 1, mention may be made of allyl fluoride and vinyl fluoride. As an example of a fluorinated monomer of which the number of fluorine atoms is 2, mention may be made of vinylidene fluoride.

A particular preference is accorded to vinylidene fluoride polymers. Vinylidene fluoride polymers are understood to denote, for the purposes of the present invention, all polymers containing at least approximately 50% by weight of monomeric units derived from vinylidene fluoride and therefore equally well homopolymers of vinylidene fluoride, as well as vinylidene fluoride copolymers with one or more ethylenically unsaturated monomers that are advantageously fluorinated. As examples of other fluorinated monomers that can be used, mention may be made of vinyl fluoride, trifluoroethylene, chlorotrifluoroethylene, tetrafluoroethylene and hexafluoropropylene.

Polymers derived from chlorinated polymers are understood to denote homopolymers of these monomers and the copolymers that these form with at least one other halogenated monomer and/or with another non-halogenated ethylenically unsaturated monomer such as vinyl esters, acrylic or methacrylic monomers, styrene monomers and olefinic monomers.

Chlorinated monomers are understood to denote ethylenically unsaturated chlorinated monomers that are aliphatic and that have for the only heteroatom or atoms one or more chlorine atoms. As examples of chlorinated monomers, of which the number of chlorine atoms is 1, mention may be made of allyl chloride, crotyl chloride and vinyl chloride. As an example of a chlorinated monomer of which the number of chlorine atoms is 2, mention may be made of vinylidene chloride.

The method according to the present invention also applies to blends of the polymers mentioned above, whether they be of the same nature or of a different nature. Among these polymer blends, mention may be made of:
blends of polystyrene and polyphenyleneoxide;
blends of polystyrene and elastomers, such as butadiene-styrene elastomeric copolymers, for example;
blends, known under the name of "ABS resins", that comprise an elastomeric phase based on a styrene-butadiene copolymer dispersed in a continuous glassy matrix based on a styrene-acrylonitrile copolymer;
blends of these ABS resins with polycarbonates;
polymer blends derived from vinyl chloride with ABS resins.

Among all the polymers and polymer blends mentioned above, good results have been obtained with polymers derived from vinyl chloride (PVC), with polymers derived from vinylidene fluorides and chlorides (PVDF and PVDC), with styrene homopolymers and copolymers, with ABS resins, with polycarbonates and with blends of these polymers. Polymers that are particularly capable of being recovered by the method according to the invention are PVc, PVDC, "crystal" polystyrene, "high-impact polystyrene", ABS resins and polycarbonates. In particular, PVC, the homo- and copolymers of styrene and ABS resins are very suitable in the method according to the invention.

The polymer may be in any form whatsoever. It may for example consist of waste from polymerization, compounding or processing, as the case may be in the liquid or pasty state, possibly even in solution in a solvent. It may also consist of solid articles containing one or more of the usual additives, such as for example plasticizers, stabilizers, antioxidants, flame retardants, pigments, fillers etc., including reinforcing fibres. These fibres may be of any kind, natural or synthetic and use may in particular be made of glass, cellulose or plastic fibres. They often consist of plastic fibres, in particular polyester fibres.

The method according to the present invention applies to the recovery of any polymer contained in a liquid medium itself containing a solvent for said polymer. According to the invention, this solvent, in which the polymer is at least partially soluble, and more often completely soluble, is generally a liquid having a solubility parameter (a definition of which and experimental values for which appear in "Properties of Polymers", D. W. Van Krevelen, 1990 edition, pp. 200-202, as well as in "Polymer Handbook", J. Brandrup and E. H. Immergut, Editors, Second Edition, p. IV-337 à IV-359) that is close to the solubility parameter for the polymer and/or having strong interactions therewith (hydrogen bonds for example). The term "close to" is intended to define the solubility parameters of the polymer (expressed in $MPa^{1/2}$) which do not generally differ between them by more than approximately 1.8.

In general, an organic, preferably polar, solvent is used, such as ketones, and in particular MEK (methyl ethyl ketone), which gives good results with many polymers and in particular with halogenated polymers such as PVC. Solvents are understood to be single substances as well as mixtures of substances. In particular, in the case of a recycling process working continuously and/or in a closed loop, the solvent may be a flow of recycled liquid and may contain a certain quantity of non-solvent. In general, the boiling point of these compounds under normal conditions is below 150° C., more often below 120° C. The possible presence of water in these compounds or these mixtures of compounds is not excluded. It is preferable nevertheless that these compounds are not very soluble in water (a low solubility generally corresponding to 30% by weight, preferably of the order of 20% by weight or even 6% by weight (in the case of DEK) based on the weight of water under normal temperature and pressure conditions) or themselves only dissolve a small amount of water.

As examples of solvents that are well suited mention may be made of:

MEK (methyl ethyl ketone), in the case where the polymer is PVC or an ABS resin;
an MEK-hexane mixture, possibly containing water, in the case where the polymer is PVC;
DEK (diethyl ketone), in the case where the polymer is "crystal" polystyrene, "high-impact" polystyrene, or an ABS resin;
cyclohexanone or cyclopentanone, in the case where the polymer is PVDF or PVDC;
a mixture of water and alcohol (ethanol, methanol, propanol etc.), in the case where the polymer is EVOH;
hexane, cyclohexane or heptane, in the case where the polymer is PE; etc.

The non-solvent used in the method according to the invention has in general a solubility parameter different from that of the polymer to be recovered and does not exhibit a strong interaction therewith. The term "different" generally signifies that the difference between the solubility parameters of the non-solvent and of the polymer exceeds 4 or even 6 units. A non-solvent that is very suitable (since it has a high solubility parameter different from that of most polymers and being advantageous from an environmental point of view) is water, particularly when the polymer to be recovered is an ABS resin, a styrene polymer or PVC. In addition, many types of plastics waste contain a not inconsiderable amount of water which will therefore also be found in the medium and therefore, from this point of view, the choice of water as a non-solvent is equally judicious. When the polymer to be recovered is PVDF or PVDC, a very suitable non-solvent is methanol.

In the method according to the present invention, the liquid medium from which the solvent must be removed in order to recover the polymer may assume various aspects, such as:

a solution of polymer in an organic solvent (pure solvent, or a mixture, or an organic phase containing water)
a dispersion of solid particles of polymer in an organic solvent (pure solvent, or a mixture, or an organic phase containing water)
an organic/aqueous biphase medium of which the matrix would be an aqueous phase (possible dispersants)
  a polymer solution in an organic phase dispersed in an aqueous phase
  a suspension of polymer particles in an organic phase dispersed in an aqueous phase
an organic/aqueous biphase medium of which the matrix would be an organic phase (possible dispersants)
  a polymer solution in an organic phase containing dispersed water droplets.
  a suspension of polymer particles in an organic phase containing dispersed water droplets.

When the source of polymer to be recovered by the method according to the present invention is a dilute solution of said polymer in a solvent (i.e. a solution containing not more than 20%, preferably not more than 10% by weight of polymer), this may be subjected as it is to the method according to the invention. Consequently, according to an advantageous first variant, the liquid medium of the method is a substantially monophase medium consisting of a solution of polymer in the solvent.

On the other hand, when the polymer source is a solid object containing said polymer, it is obviously advantageous from an economic point of view to use as little solvent as possible to put it into solution and to be able to recover it subsequently by precipitation. In this case, as mentioned earlier, it is generally advantageous not to use this solution (which is too viscous) directly but to use a dispersion (emulsion) of this concentrated resin solution in a non-solvent (aqueous phase for example, the objective being to bring the viscosity of the system towards that of water (non-solvent) at this temperature). Consequently, according to a first advantageous variant, the liquid medium of the method is a biphase medium consisting of a polymer solution (possibly containing particles of polymers) dispersed in a non-solvent phase.

The concentration, in the liquid medium of the polymer to be recovered, may vary to a large extent. In general, the quantity of polymer represents more than 5% by weight based on the total weight of the liquid medium, preferably more than 10% by weight and more particularly more than 15% by weight. This quantity of dissolved polymer does not generally exceed 60% by weight of the total weight of solution, preferably not more than 40% by weight and, more particularly, not more than 35% by weight. Too low a concentration of polymer brings about a high energy expenditure for the removal of solvent. Too high a concentration of polymer impairs the fluidity of the solution and its handling.

The temperature at which the polymer is dissolved or dispersed in the liquid medium may also vary to a large extent. It is generally above 0° C., preferably above 20° C. or more particularly at least equal to 30° C. In general, it does not exceed the normal boiling point of the solvent. Preferably, it is below 130° C., or even 110° C., more particularly below 80° C.

In order to facilitate the preparation and/or stabilization of the emulsions or biphase media mentioned previously, known dispersing agents may be incorporated in the dispersed phase in conventional quantities. As dispersing agents, mention may be made of polyvinyl alcohols and their sodium salts, cellulose ethers, polyethylene glycol etc. In general, when these dispersing agents are used, they are added at a rate of 0.01 to 2% by weight, preferably at a rate of 0.05 to 0.5% by weight.

These emulsions can be formed by any conventional method whatsoever known to a person skilled in the art. Thus, it is possible for example to add a suitable volume of the phase to be dispersed (for example water or organic phase respectively) with vigorous and rapid stirring, to a set volume of the dispersing phase (organic phase or water respectively).

Routine tests enable a person skilled in the art to determine the respective volumes of the phase to be dispersed and the dispersing phase in order to obtain a stable emulsion. Thus, for example in the case where the polymer is an ABS resin or a styrene polymer and the solvent is DEK, good results have been obtained at a temperature of between 60 and 75° C., at a pressure between atmospheric pressure and 3 bar with emulsions containing 500 g of polymer for 1000 g of DEK to which 1500 to 2000 g of water is added.

In the method according to the invention, the liquid medium containing the polymer is injected into a reactor containing a substantially monophase liquid mixture of non-solvent and solvent for the polymer. The solvent present in said substantially monophase mixture (also called simply "the mixture" in the present description) meets the definitions and limitations stated above with respect to the liquid medium containing the polymer to be recovered. Most usually, the solvent of the liquid medium and the solvent of the mixture are compounds of similar natures, having solubility parameters that are close or even identical. Preferably, the solvent of the liquid medium and of the mixture is the same compound.

According to the invention, the solvent and the non-solvent are at least partially miscible since they are capable of forming a monophase medium when a major fraction of non-solvent and a minor fraction of solvent are mixed.

The respective quantities of solvent and non-solvent to be used in order to obtain a substantially monophase liquid mixture may be easily determined by routine tests. It is possible for example to proceed by progressively adding solvent to a liquid phase consisting of non-solvent until saturation prior to any decantation. Thus, for example, in the case where the non-solvent is water and the solvent is MEK or DEK, good results have been obtained by saturating the aqueous phase with respectively 15 to 20% or 3 to 5% by weight of solvent at a temperature between 60 and 90° C. at a pressure of between 0.5 and 1 bar. The advantage of working with non-solvents saturated with solvent lies in the considerable retardation of precipitation and improvement of the drainage of solvent to the liquid medium in the reactor. On the other hand, care will be taken to adapt the conditions (in particular temperature and pressure, according to the solvent/non-solvent phase diagram) so as not to bring about the appearance of a solvent phase, which would cause the polymer particles to agglomerate as they form.

The preparation of the substantially monophase liquid mixture can be facilitated by incorporating the dispersing agents mentioned above in the non-solvent. The presence of these dispersants is also advantageous in as much as it makes it possible to regulate the morphology and size of polymer particles recovered following the method according to the invention.

Injection of the liquid medium containing the polymer to be recovered into the substantially monophase liquid mixture can be carried out in any way whatsoever known to a person skilled in the art. Preferably, this injection is carried out by introducing the liquid medium into the liquid mixture in the form of a continuous jet or a spray of the first into the second. The latter gives good results since it encourages the obtaining of small size droplets from which the drainage of solvent to the liquid mixture is facilitated.

Spray nozzles that can be used to that purpose are preferably of the "full cone" type, preferably working at low pressure (typically below 7 bars) and giving medium to low size droplets (typically between 500 and 1700 µm). FULLJET® systems commercialized by the company Spaying Systems Co. give good results. These create a controlled turbulence at their exit, what seems to be favourable. More preferably, modular systems (of which the head and the diverging part can be dismantled and changed) are used. These parts are preferably metal parts, and most preferably, made of stainless steel.

As soon as the liquid medium containing the polymer is injected into the liquid medium constituting the precipitation "bath", the polymer starts to precipitate and the aforementioned droplets are progressively purified from solvent so as to constitute particles or particles of polymer suspended in a liquid. As previously mentioned, it is important to avoid agglomeration of the particles during formation by adequate stirring of the bath: A mechanical stirrer may be used to this end (of the propeller type, for example) rotating at speeds of the order of hundreds of rpm (revolutions per minute), for example between 500 and 800 rpm. The receptacle containing the liquid medium is also advantageously provided with counter-blades.

In the method according to the invention, whether this be continuous or discontinuous, care will generally be taken to remove a substantial fraction of the solvent before recovering the suspension of polymer particles. Consequently, what is recovered following progressive precipitation of the polymer, is a suspension of polymer particles in a liquid rich in non-solvent, that is to say containing typically less than 20% by weight of solvent (case of MEK), or even less than 6% by weight of solvent (case of DEK).

This solvent removal can be carried out by any suitable means. It is preferred to remove solvent by evaporation at any suitable pressure, which is of course only possible if a solvent is chosen which evaporates before the non-solvent and/or which forms an azeotrope therewith rich in solvent. According to an advantageous variant of the method according to the invention, the solvent and the non-solvent form an azeotrope rich in solvent and the liquid mixture is subjected to distillation under virtually azeotropic conditions by injecting non-solvent vapour. This procedure is in fact advantageous from an energy point of view when an azeotrope is involved of which the boiling point is below that of its components. It is then preferred to work (for a given pressure) at a temperature slightly above that of the azeotrope in order to prevent the formation of an organic phase in the initially monophase mixture, which could bring about agglomeration of the polymer particles.

A pressure below atmospheric pressure is preferably used to accelerate evaporation. Generally, this pressure lies between 0.1 and 1 bar, preferably between 0.5 and 1 bar. For example, a pressure of 600 mbar and a temperature of 60° C. (75° C.) or a pressure of 1 bar and a temperature of 80° C. (90° C.) give good results with the pairs MEK/water and DEK/water.

In the case where the method according to the invention is a batch method, the "azeotropic" distillation preferably is continued to the end before the suspension of polymer particles is recovered. This is understood to mean that substantially all the solvent is removed from the liquid contained in the reactor.

However, as stated previously, one advantage of the method according to the invention is that it can be adapted to operate continuously but then, of course, the composition of the liquid in the reactor is preferably constant (at least when operation in a steady state is attained) and therefore such substantial elimination is no longer possible. Consequently, according to another preferred variant, the method according to the invention is a continuous method in which injection of the liquid medium and non-solvent vapour, as well as recovery of the suspension of polymer particles, take place continuously at flow rates and under conditions that are adapted so as to maintain the reactor in a steady state, under the chosen (quasi) azeotropic distillation conditions (temperature, pressure, composition). In this method, the solvent used to dissolve the polymer generally contains a certain quantity (minor by weight) of non-solvent and, conversely, the non-solvent used to precipitate the polymer contains a fraction (minor by weight) of solvent. This is linked to the fact that, advantageously, the various flows emitted are reused as they are (without prior treatment) in the method.

Following substantial removal of the solvent, well formed polymer particles are then recovered that are suspended in the medium rich in non-solvent remaining or constituting the liquid medium contained in the reactor. These particles can then be separated from the non-solvent by any conventional means for separating a solid from a liquid, such as decantation, centrifuging (drainage), filtration, steam-stripping etc. It is also possible to combine such treatments. It is possible for example to combine filtration/centrifuging and drying/stripping with the aid of a suitable apparatus such as a stripping column, for example. On account of the fact that the polymer particles obtained by the method according to the invention have been drained and their residual solvent content is low, the size of such a column may be reduced compared with that which would be necessary in an installation operating with the method according to the aforementioned application WO 03/054064.

An important advantage of the recovery method according to the invention is that it can operate in a closed loop (either continuously or in batches, but with virtually total recirculation of the solvent, without generating waste). Indeed, the liquid remaining after polymer particles have been separated, which principally consists of non-solvent, may optionally be recycled by means of a suitable treatment. This treatment may consist of one or more distillations, flocculations, decantations, washings etc. and of combinations of these treatments.

According to a particularly advantageous variant, at least part of the liquid treated in this way can serve to rinse the reactor and to prevent its encrustation. Indeed, in general, the reactor (or normally closed chamber, generally regulated in temperature and pressure, provided with a stirrer and possibly provided with an opening or openings that can be closed and/or tubes for introducing reagents and additives, etc. and for withdrawing products (polymer, liquid, vapour)) has an inner wall of which a lower part is in contact with the liquid mixture and an upper part is in contact with a gaseous phase into which the liquid medium is injected. Preferably, a fraction of the liquid coming from the suspension after separation of the polymer particles is used to rinse continuously, at least a fraction of the upper part of the inner wall of the reactor.

Similarly, when the solvent(s) has or have been eliminated from the suspension by azeotropic distillation with water, the vapours resulting from this distillation may be condensed and constitute a liquid phase that can be treated as described above and recycled so as to be used in the method, for example for dissolving the polymer.

BRIEF DESCRIPTION OF THE DRAWINGS

The present invention is illustrated in a non-limiting manner by FIGS. 1 to 3.

Figure 1:
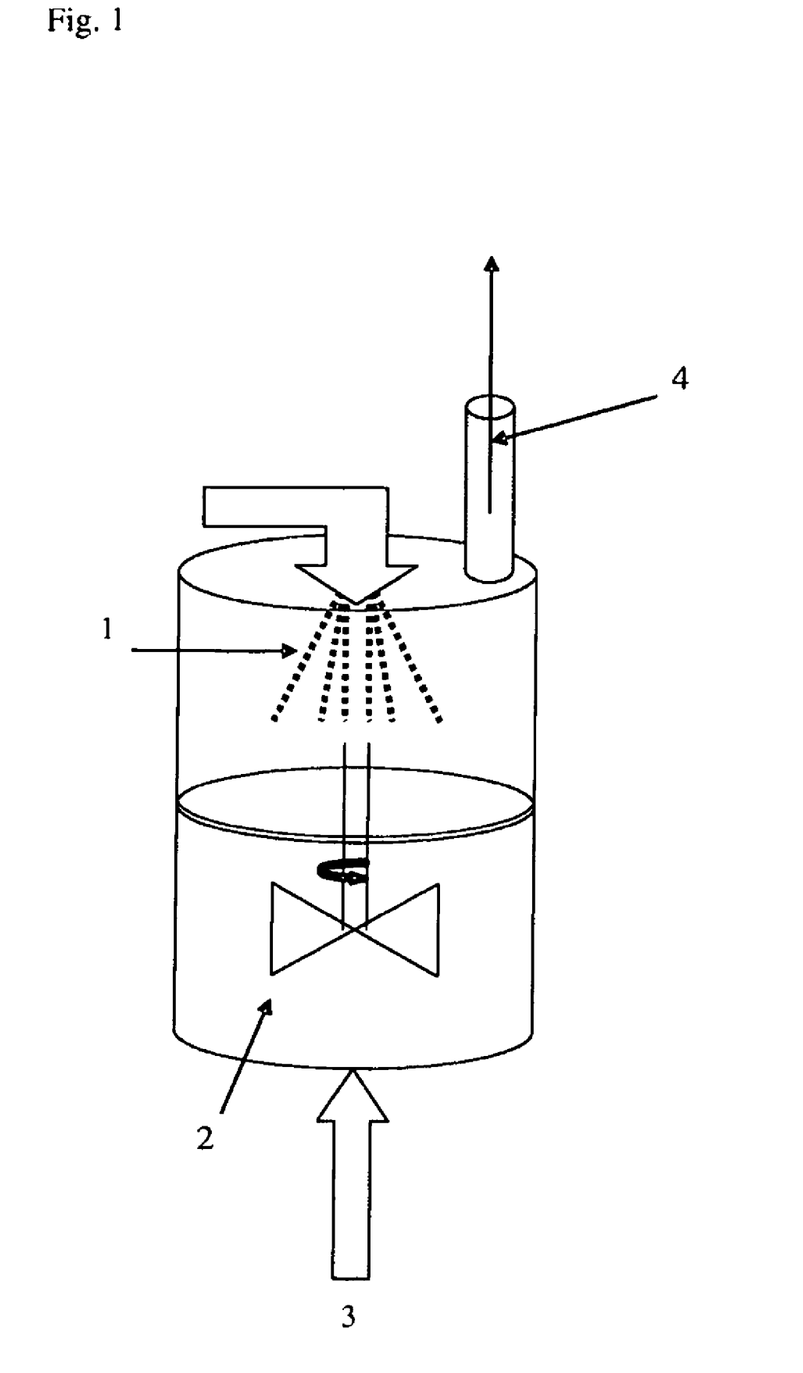
FIG. 1 is a process diagram of a variant of the invention.

In FIG. 1 a stirred reactor (2) can be seen containing a principally monophase medium consisting of water saturated with DEK and containing a suspending agent (Poval 420). In this reactor, which is in a steady state and of which the temperature is regulated to 75° C. and the pressure to 600 mbar, an ABS solution or emulsion (1) is injected, as well as steam (3) in order to remove DEK (or a substantial fraction thereof) by distillation under quasi-azeotropic conditions. The vapours emitted (4) are collected and condensed in order to be reused.

Figure 2:
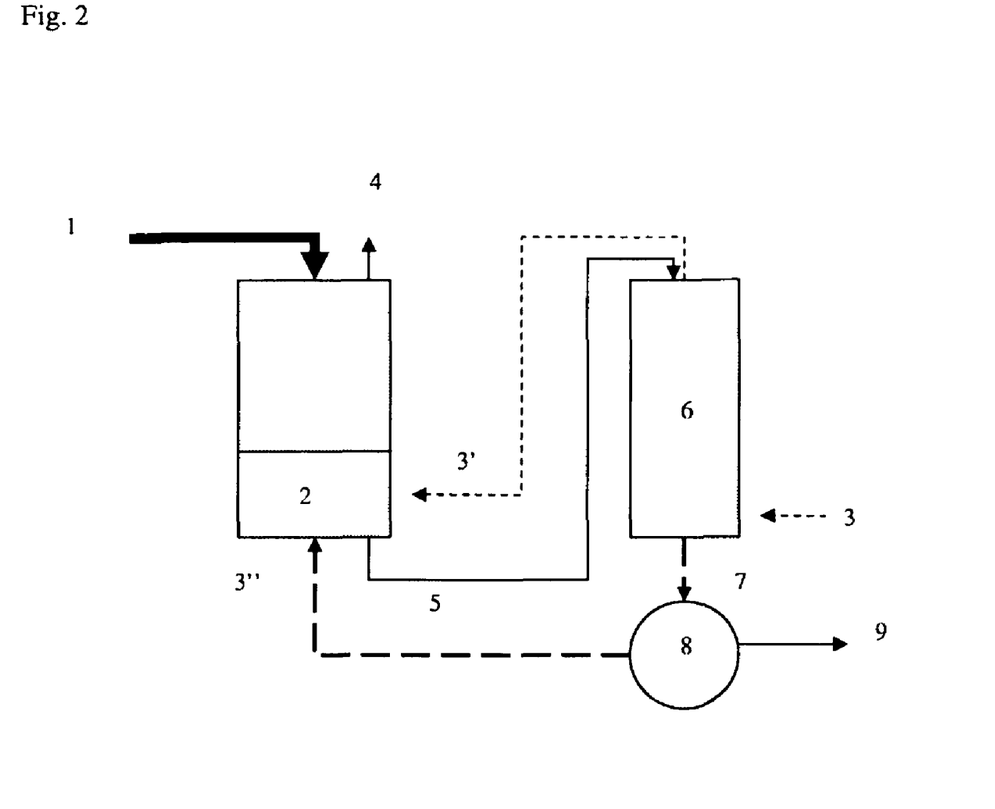
FIG. 2 is an example of a continuous method according to this variant of the invention and FIG. 3 illustrates in part a particularly preferred variant of the latter. In these figures, identical numbers denote identical or similar elements.
Figure 3:
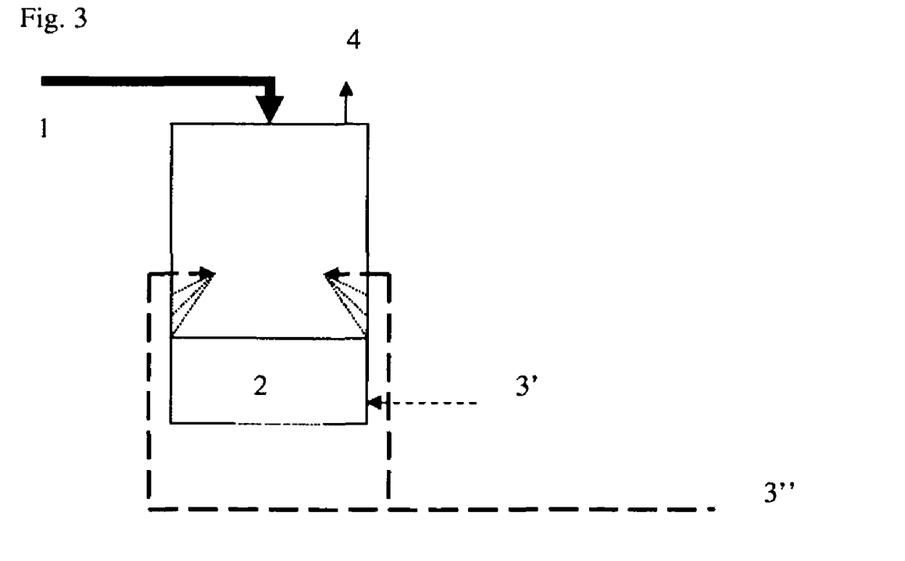

In FIG. 2, it is possible to see how to carry out this continuous method by means of suitable treatments and flows of reagents. It is sufficient in point of fact to take off continuously a flow of a suspension (5) of polymer particles present in the bottom of the reservoir (2); to treat this flow (5) in a stripping column (6) in which steam (3) is injected in counter currently; to recover part of the stripped polymer particles (7) that is to say those purified from solvent but loaded with water, and on the other hand a flow of steam (3') loaded with solvent that is injected into the reactor (3') as a source of steam; of draining the particles of polymer loaded with water (8) so as to obtain on the one hand, a flow of moist particles (9) that will be dried (which is likely to generate a flow of steam that is not shown, that can be used in the process) and, on the other hand, a stream of water (3") also recycled to the reactor, and which may, as illustrated in FIG. 3 act as a rinsing/anti-encrusting agent for the reservoir.

The following examples are also intended to illustrate the invention without restricting its scope. They use a reactor as described in FIG. 1, of the batch type. The resins used are Novodur® 2PH-AT from Bayer (ABS) and Styron® 485 from Dow (HIPS).

EXAMPLES 1 TO 3

These examples illustrate the obtaining of ABS beads from a 20% solution of ABS in pure MEK or a pure 25% solution in pure DEK. In order to do this, the solution was introduced by spraying (atomization) into a monophase mixture occupying the bottom of a cylindrical reactor fitted with counter-blades and provided with a propeller stirrer rotating at 650 rpm, which mixture was obtained by introducing 300 g of MEK or 200 g of DEK into 2000 g of water containing, as a dispersing agent, a polyvinyl alcohol (PVA) Poval® 420 at a rate of 0.3 to 0.4% by weight based on the weight of resin to be received.

The monophase mixture with an aqueous matrix in which the solution had been atomized was saturated with solvent (MEK or DEK). The composition in this monophase mixture was determined by the desired temperature and pressure conditions. The pressure was regulated by a vacuum pump and the medium was heated by adding steam through the bottom of the reactor. When the solvent/water azeotrope began to distil, the flow of steam was regulated so as to obtain the desired temperature at the desired pressure. Finally, when the system was in a steady state, the polymer solution was injected. Regulation of the flow of steam was continued so that the temperature and pressure remained constant inside the reactor during the period in which solvent was removed.

Atomization was carried out with the aid of a FullJet® ⅛ GG-SS1 nozzle from a solution at the temperature and pressure of the dissolving reactor. The operating conditions of examples 1 to 3 are given in Table 1 below.

TABLE 1

| | Conditions for preparing the solution | | | Conditions in the reactor | | | | |
|---|---|---|---|---|---|---|---|---|
| Ex. | Solvent (g) | ABS (g) | P (bar) | T (° C.) | #Water (g) *MEK **DEK (g) | PVA (g) | P (mbar) | T (° C.) | Comments |
| 1 | 1500 (MEK) | 300 | 3 | 30 | #2000 *300 | 1.2 | 600 | 60 | Beads obtained <600 μm in diameter |
| 2 | 1500 (MEK) | 300 | 3 | 30 | #2000 *300 | 1.2 | 1000 | 80 | Beads obtained <600 μm in diameter |
| 3 | 1000 (DEK) | 250 | 3 | 60 | #2000 **200 | 0.8 | 600 | 75 | Grain obtained (<1 mm) |

P = pressure;
T = temperature.

These examples show that the method according to the invention makes it possible to obtain beads of ABS resin with very specific morphologies (beads with d<600 μm), by atomizing concentrated solutions of ABS in MEK or DEK, into a monophase mixture with an aqueous matrix saturated with MEK (examples 1 and 2) or with DEK (example 3).

EXAMPLES 4 à 7

These examples show how it is possible, according to the method of the invention, to recover polymer particles from highly concentrated, and therefore highly viscous, solutions. In this case, removal of solvent is achieved by spraying, no longer a single solution, but a dispersion (emulsion) of a concentrated polymer solution into an aqueous phase (non-solvent), the aim being to bring the viscosity of the system towards that of water (non-solvent) at the temperature at which the procedure is carried out. The dispersion is "atomized" into water containing a suitable dispersing agent, in this case a polyvinyl alcohol (PVA): Poval® 420.

The aqueous phase into which the solution was atomized in the reactor was also saturated with solvent. The composition of this monophase mixture was determined by the desired temperature and pressure conditions. It was obtained by introducing 2000 g of water and 200 g of DEK into the precipitation reactor. The pressure was regulated by a vacuum pump and the medium was heated by adding steam through the bottom of the reactor. When the DEK/water azeotrope began to distil, the flow of steam was regulated so as to obtain the desired temperature at the desired pressure. Finally, when the system was in a steady state the polymer solution was injected. The flow of steam was regulated so that the temperature and pressure remained constant inside the reactor during the operation for removing solvent. Atomization was carried out with the aid of a FullJet ⅛ GG-SS1 nozzle from a solution at the temperature and pressure of the dissolving reactor. The operating conditions are given in Table 2 below.

TABLE 2

| | Composition of the dispersion | | | Temperature and pressure conditions | | Composition of the monophase mixture in the reactor | | Temperature and pressure conditions in the reactor | | |
|---|---|---|---|---|---|---|---|---|---|---|
| Example | DEK (g) | Water (g) | Polymer (g) | P (bar) | T (° C.) | #Water (g) *DEK (g) | PVA (g) | P (mbar) | T (° C.) | Comments |
| 4 | 1000 | 1500 | 500 (ABS) | 3 | 60 | #2000 *200 | 0.8 | 600 | 75 | Emulsion atomized, particles obtained (<2 mm) |
| 5 | 2000 | 3000 | 1000 (HIPS) | 3 | 60 | #2000 *200 | 0.8 | 600 | 75 | Emulsion atomized, particles obtained (<1 mm) |
| 6 | 2000 | 3000 | 1000 (HIPS) | 3 | 75 | #2000 *200 | 0.8 | 1000 | 90 | Emulsion atomized, particles obtained (<1 mm) |
| 7 | 1000 | 2000 | 500 (HIPS) | 3 | 60 | #2000 *200 | 0.8 | 600 | 75 | Emulsion atomized, particles obtained (<1 mm) |

P = pressure;
T = temperature.

Example 4 shows that if an emulsion is prepared, with vigorous stirring, from an ABS solution to which 1500 g of water has been added, it is possible to spray the combination and to recover the polymer in the form of particles in the precipitating reactor. Examples 5, 6 and 7 show that it is possible to perform similarly with HIPS and at various temperature and pressure conditions.

The invention claimed is:

1. A method for recovering a polymer from a liquid medium comprising the polymer and a first solvent for the polymer, the method comprising:

injecting the liquid medium into a reactor comprising a stirred substantially monophase liquid mixture comprising a major fraction by weight of a non-solvent for the polymer and a minor fraction by weight of a second solvent for the polymer which may be the same or different from the first solvent, the liquid mixture having a composition and temperature such that the polymer precipitates therefrom progressively.

2. The method according to claim 1, wherein the polymer is chosen from polymers derived from vinyl chloride, polymers derived from vinylidene fluorides and chlorides, styrene homopolymers and copolymers, ABS resins, polycarbonates, homopolymers of ethylene or propylene, copolymers of ethylene and vinyl or butyl acetate, and blends of these polymers.

3. The method according to claim 1, wherein the first solvent is methyl ethyl ketone or diethyl ketone.

4. The method according to claim 1, wherein the non-solvent is water.

5. The method according to claim 1, wherein the liquid medium is a substantially monophase medium consisting of a solution of polymer in said first solvent.

6. The method according to claim 1, wherein the liquid medium is a biphase medium consisting of a polymer solution dispersed in a non-solvent phase.

7. The method according to claim 6, wherein the liquid medium further comprises a dispersing agent.

8. The method according to claim 1, wherein the liquid mixture further comprises a dispersing agent.

9. The method according to claim 1, wherein the liquid medium is injected into the liquid mixture in the form of a continuous jet or a spray of the liquid medium into the liquid mixture.

10. The method according to claim 1, wherein the first solvent, second solvent, or both the first and second solvents and the non-solvent form an azeotrope rich in solvent and wherein the liquid mixture is subjected to distillation under quasi-azeotropic conditions by injecting non-solvent vapour.

11. The method according to the preceding claim 10, wherein it is a batch process in which the azeotropic distillation of the solvent is continued to the end before recovering a suspension of polymer particles.

12. The method according to claim 10, wherein it is a continuous method in which injection of the liquid medium and of the non-solvent vapour, as well as recovery of a suspension of polymer particles take place continuously, with flow rates and conditions adapted so as to maintain the reactor in a steady state, under the chosen (quasi) azeotropic distillation conditions (temperature, pressure, composition).

13. The method according to claim 12, wherein the reactor has an inner wall of which a lower part is in contact with the liquid mixture and an upper part is in contact with a gaseous phase into which the liquid medium is injected, and in that a fraction of the liquid derived from the suspension after separation of the polymer particles is used to rinse continuously at least a fraction of the upper part of the inner wall of the reactor.

14. The method according to claim 1, further comprising recovering the polymer in the form of particles in suspension in a liquid rich in non-solvent.

15. The method according to claim 14, further comprising separating the polymer particles from the liquid rich in non-solvent.

16. The method according to claim 1, wherein the polymer is chosen from polymers derived from vinyl chloride.

17. The method according to claim 16, wherein the first solvent is methyl ethyl ketone or diethyl ketone.

18. The method according to claim 17, wherein the second solvent is methyl ethyl ketone or diethyl ketone.

19. The method according to claim 1, wherein the first and second solvent are identical.

20. The method according to claim 19, further comprising recovering the polymer in the form of particles in suspension in a liquid rich in non-solvent followed by separating the polymer particles from the liquid rich in non-solvent.

* * * * *